(12) United States Patent
Mitchell

(10) Patent No.: US 9,442,953 B2
(45) Date of Patent: Sep. 13, 2016

(54) UNIVERSAL ADDRESS BOOK

(75) Inventor: Douglas R. Mitchell, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 605 days.

(21) Appl. No.: 12/762,167

(22) Filed: Apr. 16, 2010

(65) Prior Publication Data

US 2011/0258159 A1  Oct. 20, 2011

(51) Int. Cl.
*G06F 17/30* (2006.01)
*G06Q 10/10* (2012.01)
*H04M 1/2745* (2006.01)
*H04M 3/493* (2006.01)
*H04M 7/00* (2006.01)
*H04L 29/08* (2006.01)

(52) U.S. Cl.
CPC ... *G06F 17/30174* (2013.01); *G06F 17/30575* (2013.01); *G06Q 10/10* (2013.01); *H04M 1/274516* (2013.01); *H04L 67/1095* (2013.01); *H04M 3/4931* (2013.01); *H04M 7/006* (2013.01); *H04M 2203/6009* (2013.01); *H04M 2207/18* (2013.01)

(58) Field of Classification Search
USPC .................................. 707/610, 694
See application file for complete search history.

(56) References Cited

U.S. PATENT DOCUMENTS

2004/0024846 A1* 2/2004 Randall et al. ............... 709/219
2004/0267625 A1* 12/2004 Feng et al. .................... 705/26
2005/0059418 A1* 3/2005 Northcutt ................ G06F 17/30
2006/0122936 A1* 6/2006 Balfanz ........................... 705/51
2008/0005263 A1* 1/2008 Baraev et al. ................ 709/217
2008/0205655 A1* 8/2008 Wilkins et al. ............... 380/279
2009/0043805 A1* 2/2009 Masonis et al. .............. 707/102
2009/0143052 A1* 6/2009 Bates et al. ............ G06F 17/30
2010/0180212 A1* 7/2010 Gingras et al. ............... 715/751
2010/0222085 A1* 9/2010 El Bedraoui ................. 455/466
2010/0235446 A1* 9/2010 Hehmeyer et al. ........... 709/205

FOREIGN PATENT DOCUMENTS

| CN | 1731431 A | 2/2006 |
|---|---|---|
| CN | 201142742 Y | 10/2008 |
| EP | 2081358 A1 | 7/2009 |
| EP | 2222056 A1 | 8/2010 |
| JP | 2002141998 A | 5/2002 |
| JP | 2006157922 A | 6/2006 |
| JP | 2007312335 A | 11/2007 |
| JP | 2010033385 A | 2/2010 |
| KR | 20030015342 A | 2/2003 |
| WO | 2008113153 A1 | 9/2008 |

OTHER PUBLICATIONS

International Search Report and Written Opinion—PCT/US2011/030023, ISA/EPO—Jul. 1, 2011.

* cited by examiner

*Primary Examiner* — Son T Hoang
(74) *Attorney, Agent, or Firm* — Raphael Freiwirth

(57) ABSTRACT

An embodiment is directed to synchronizing a universal address book located in a database amongst a first user and a second user. The first user sends an initialization message to the database and an invitation message to the second user. The first user receives an acceptance message from the second user and sends an update message to the database. The initialization message includes current personal data of the first user, the invitation message includes a database pointer, and the update message changes the personal data of the first user in the database and prompts the database to inform the second user of the changed data of the first user.

53 Claims, 11 Drawing Sheets

UNIVERSAL ADDRESS BOOK

BACKGROUND OF THE INVENTION

1. Field of Invention

The invention relates to wireless communication systems and a universal address book that can be utilized to manage a variety of user contact information.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals that can be commonly associated such as within a given cell, served by a given service provider, and the like, while a "multicast" refers to a transmission of data packets to a given group of destinations or access terminals. In an example, the given group of destinations or "multicast group" may include more than one and less than all of possible destinations or access terminals that otherwise share a common association. However, it is at least possible in certain situations that the multicast group includes only one access terminal, similar to a unicast, or alternatively that the multicast group comprises all access terminals sharing a common association, similar to a broadcast.

In addition to various transmission schemes such as unicast, multicast, broadcast that may be used, a call may generally be classified as a half duplex or a full duplex communication for at least some of the participants. A PTT is a half duplex call that corresponds to a server mediated communication between two or more identified access terminals, regardless of the various configurations used to conduct the PTT calls. Full duplex calls can generally include VoIP calls and other calls that allow simultaneous transmission and reception.

Users of wireless devices have many methods of communicating including traditional Voice, Short Message Service (SMS), Multimedia Messaging Service (MMS), Email, and Voice over Internet Protocol/Session Initiation Protocol (VoIP/SIP providers. Furthermore, soon each user may also have PTT/PTX options. Further, each user may have multiple accounts with multiple providers, for example, business and personal use which results in an explosion of per-user contact-methods which are difficult to manage in an integrated fashion on a wireless device. Users may need to be able to manage all of these different per-user contact methods in an integrated fashion from their mobile device or from a web-based application, including the ability to sync with local contact management applications.

Personal Information Managers (PIMs) such as, for example, Outlook® by Microsoft Corporation, can synchronize with wireless devices, but often not with a large network provider or global address book. Further, most PIM software does not natively support synching a large number of communication methods to a wireless device in a predictable fashion.

Conventional cellular phones generally have an address book, which can be locally stored or can be stored by the network, such as in the GMS Subscriber Identity Module in a GSM network. The address books of individual cellular phones are typically not synchronized in a useful manner to the address books of other phones. Further, synchronization in the form of a very simple point-to-point provider synchronization exists and can either be synchronized to a network provider such as the address book back up service offered by Verizon Corporation, or to a back-up storage medium. Cross-synchronization amongst users however is not common.

Conventional vCards can be sent from one party to another containing name and address information, phone numbers, URLs, logos, photographs, and even audio clips. vCard is a file format standard for electronic business cards. vCards are often attached to e-mail messages, but can be exchanged in other ways, such as on the World Wide Web. However, vCard data can quickly become outdated/inaccurate and it is not easy to update without sending the card.

Thus, a need exists for managing different per-user contact methods in an integrated fashion from a mobile device or from a web-based application, including the ability to synchronize with local contact management applications. Further, a need exists for providing a universal address book (subject to privacy restrictions) that can provide a source of known-good directory information from the wireless carrier or other provider. For example, permission to access a person's contact record may be determined by a users' relationship in a social networking application such as MySpace or Facebook. Furthermore, a universal address book can allow wireless carriers to inter-operate with each other in a seamless way, providing a much "cleaner" and faster user experience.

SUMMARY

Exemplary embodiments of the invention are directed to systems and method for synchronizing a universal address book located in a database amongst a first user and a second user. In accordance with various aspects, an initialization message can be sent to the database from a first access terminal. The initialization message can include personal data of the first user. An invitation message can be sent to the second access terminal. The invitation message can include a database pointer. An update message can be sent to the database from the first access terminal. The update message changes the personal data of the first user in the database and informs the second access terminal of the updated personal data of the first user.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
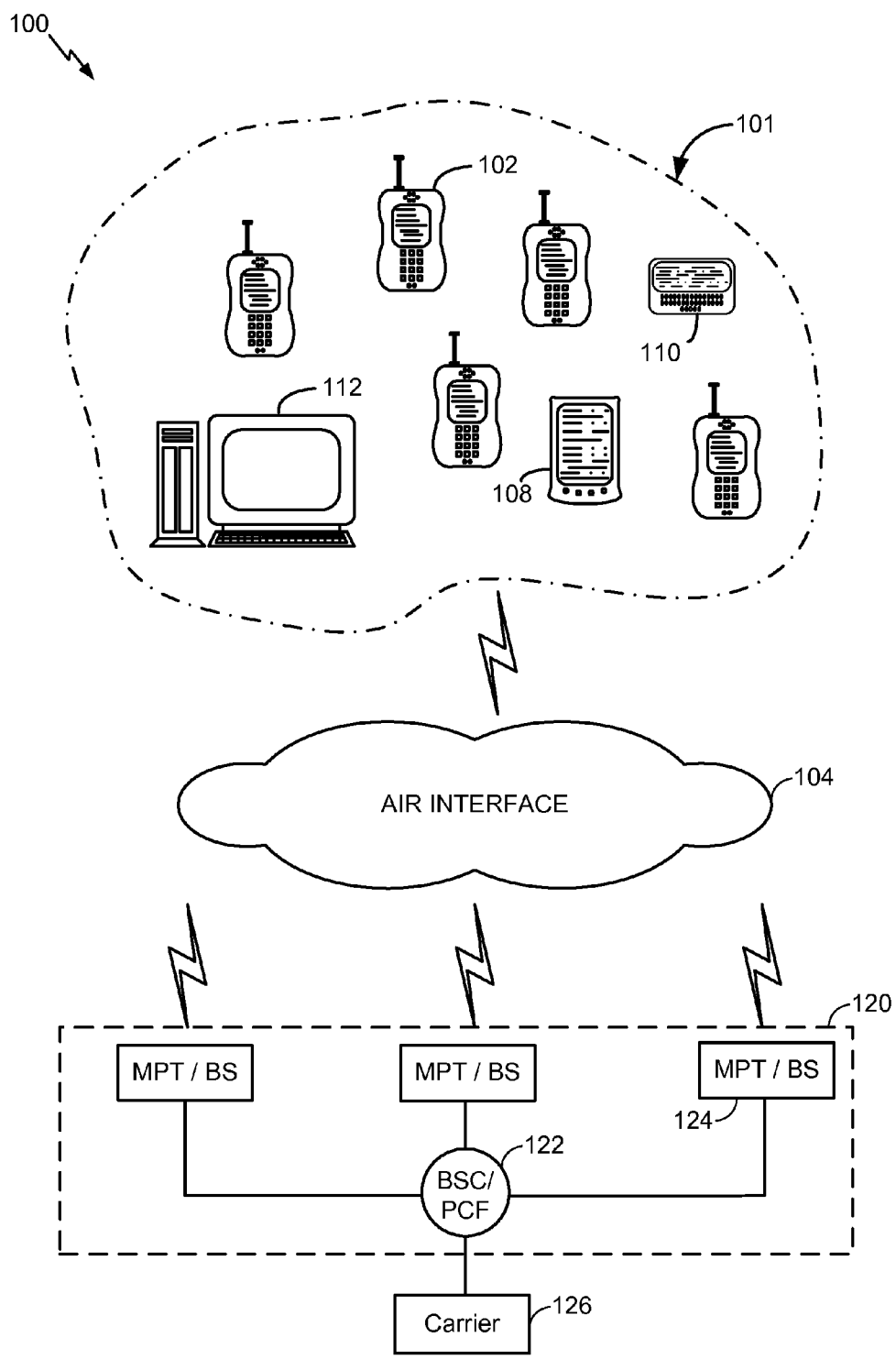
FIG. 1 is a diagram illustrating a wireless network architecture that supports access terminals and access networks in accordance.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits such as application specific integrated circuits (ASICs), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further include but is not limited to auxiliary devices that operate independently or in connection with computers such as PC card, compact flash, external or internal modem, or wireless or wireline phone. Additionally, devices that can act as access terminals can include laptop-integrated modems, PDAs such as the BlackBerry® by Research In Motion and the Pre™ by Palm Inc., or any device of which may be used to access database or application servers using IP. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network such as an intranet, the Internet, and/or carrier network 126, and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network.

Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
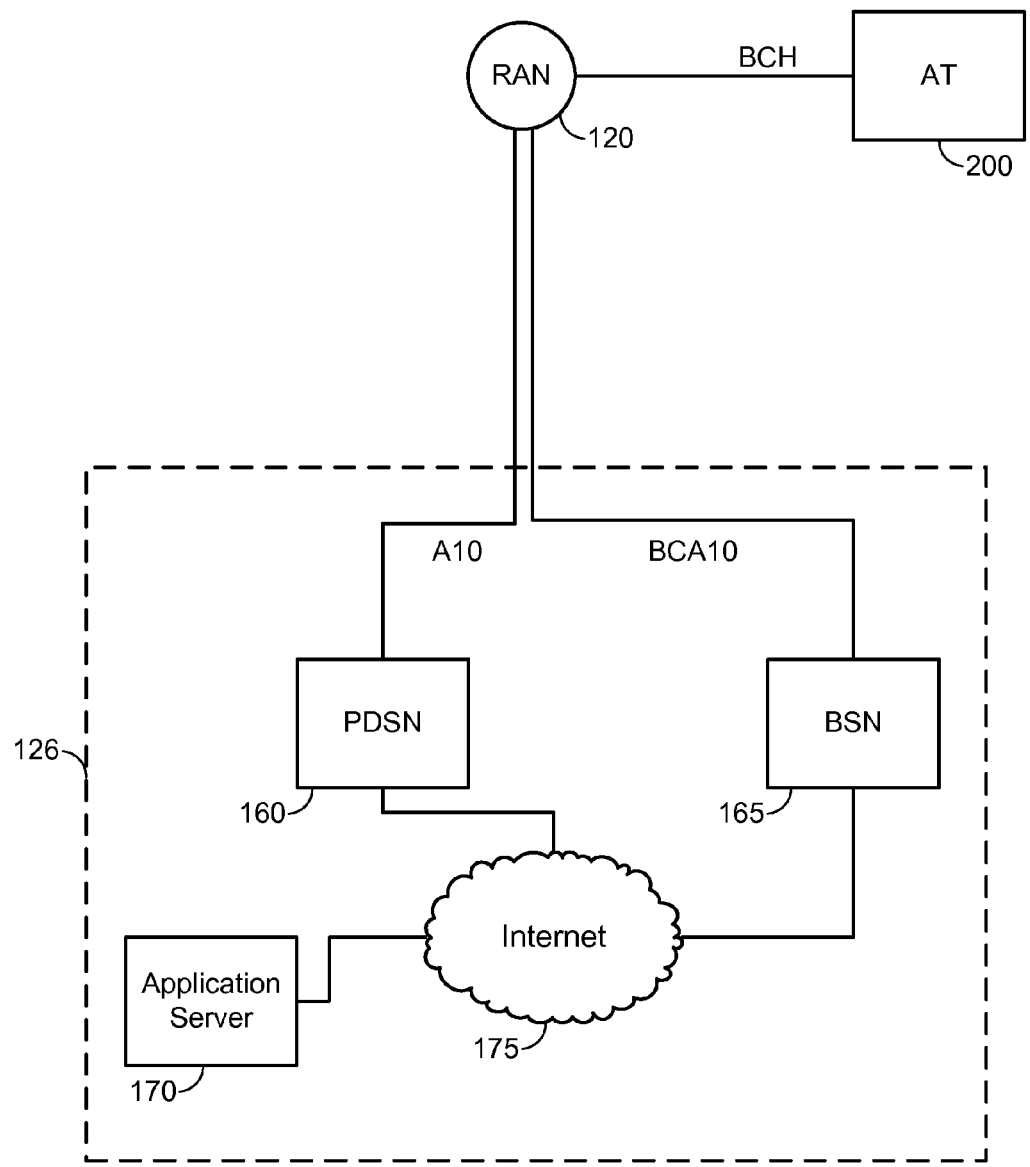
FIG. 2 is a diagram illustrating a carrier network.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers such as application server 170, for mobile stations, including for example those acting as access terminals, such as 102, 108, 110, 112 from FIG. 1, utilizing, for example, a cdma2000 Radio Access Network (RAN) such as RAN 120 of FIG. 1. Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 by way of, for example, the BSC/PCF 122, via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 communicates with the RAN 120 by way of the BSC/PCF 122, via a broadcast (BC) A10 connection, and with the application server 170 via the Internet 175. The BCA10 connection is used to transfer multicast and/or broadcast messaging. Accordingly, the application server 170 may send unicast messaging to the PDSN 160 via the Internet 175, and may send multicast messaging to the BSN 165 via the Internet 175.

Figure 3:
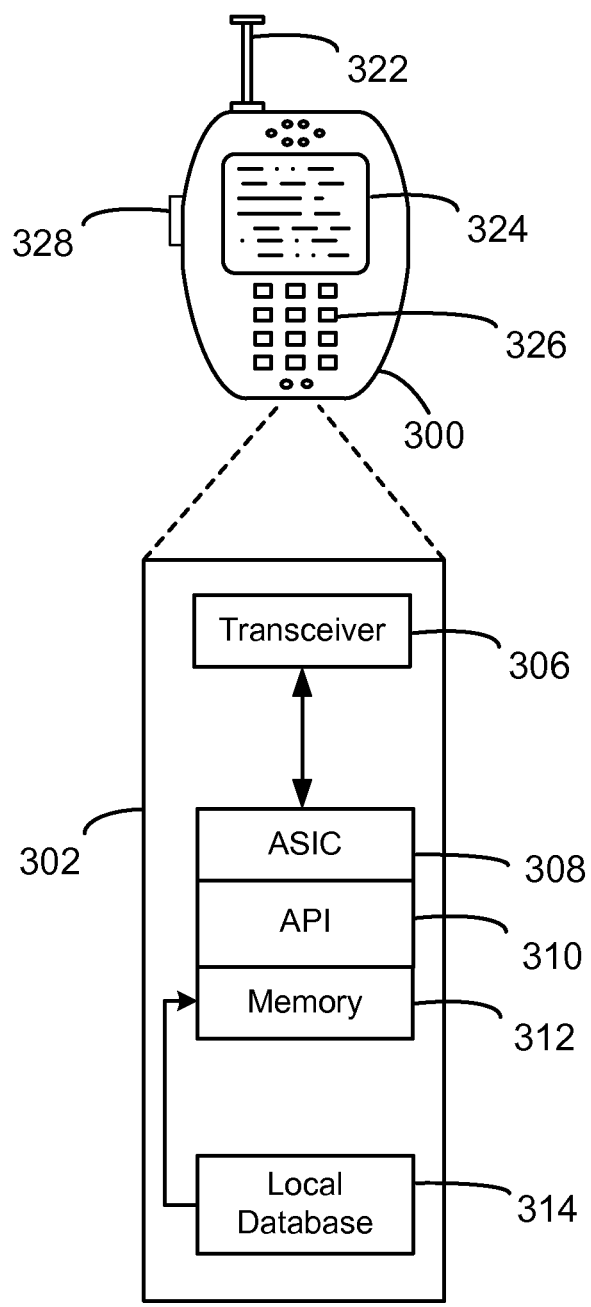
FIG. 3 is a diagram illustrating an access terminal.

Referring to FIG. 3, an access terminal 200, which, in the present example can be a wireless device such as a cellular telephone, has a platform 302 that can receive and execute software applications, data and/or commands transmitted from the RAN 120 that may ultimately come from the carrier network 126, the Internet and/or other remote servers and networks. The platform 302 can include a transceiver 306 operably coupled to an application specific integrated circuit (ASIC) 308, or other processor, microprocessor, logic circuit, or other data processing device. The ASIC 308 or other processor executes the application programming interface ("API") 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can hold applications not actively used in memory 312 and user data, such as contact information associated with an address book or the like as will be described in greater detail hereinafter. It should be noted that the local database 314 can refer generally to a data store including an application that allows structured access to the contents thereof and that can reside in memory such as a flash memory device, but can the database 314 can be associated with any secondary storage device as known in the art, such as magnetic media, EEPROM, optical media, tape, soft or hard disk, or the like. The internal platform 302 components can also be operably coupled to external devices such as antenna 322, display 324, push-to-talk button 328 and keypad 326 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), wideband-CDMA (WCDMA), time division multiple access (TDMA), frequency division multiple access (FDMA), orthogonal frequency division multiple access (OFDMA), the Global System for Mobile Communications (GSM), Long Term Evolution (LTE) or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4:
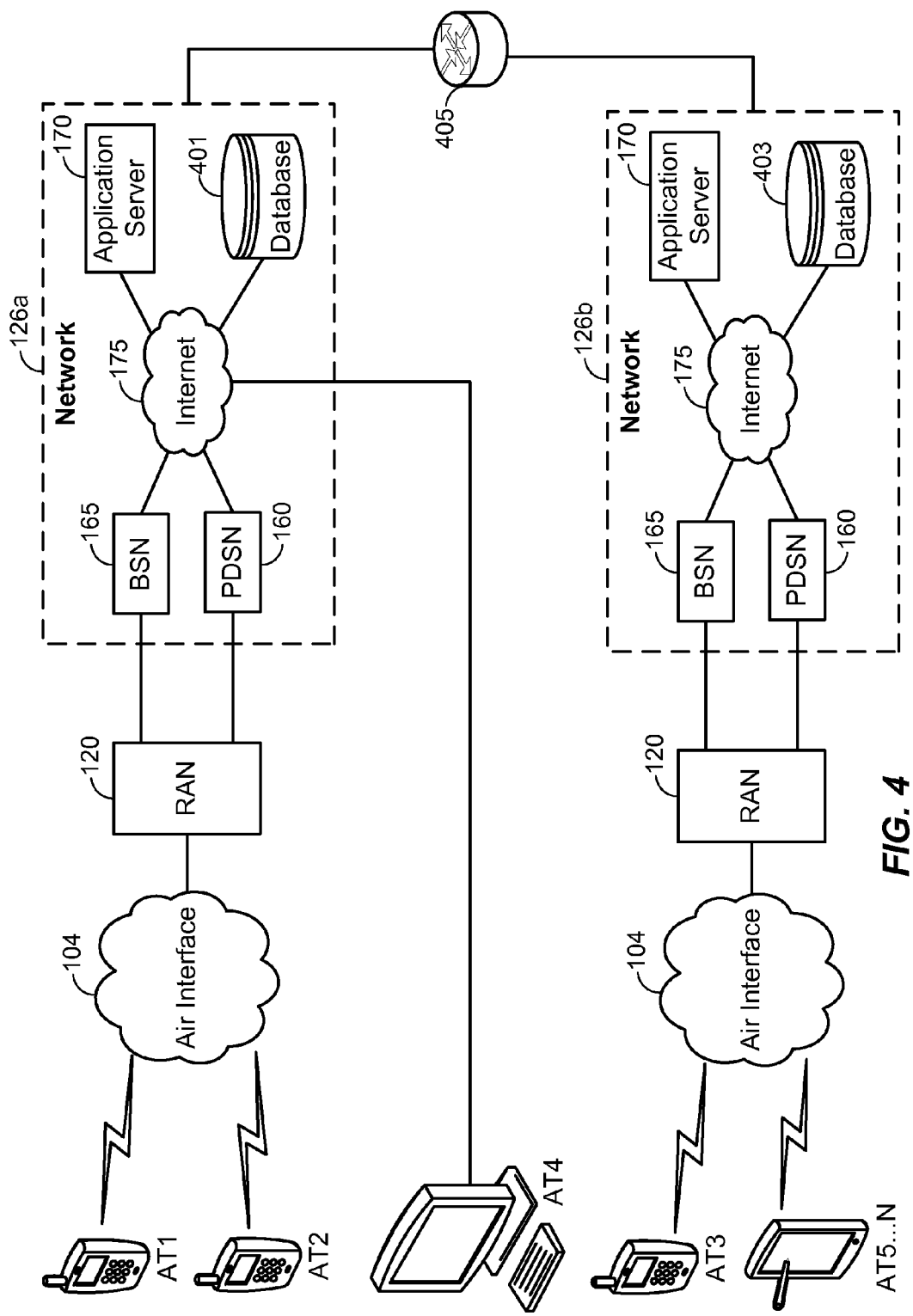
FIG. 4 is a diagram illustrating an exemplary network including an access terminal communicating with a wireless communication system.

Referring to FIG. 4, an exemplary network illustrating a plurality of access terminals (i.e. AT1, AT2, AT3, AT4 and AT5 . . . N) communicating with wireless communication system 100. Carrier networks 126a and 126b can be connected to various access terminals (i.e. AT1, AT2, AT3, AT4 and AT5 . . . N) via air interface 104 and RAN 120. Further, carrier networks 126a and 126b can also be connected to each other via gateway or routing unit 405. Each of the access terminals (i.e. AT1, AT2, AT3, AT4 and AT5 . . . N) may communicate with database(s) 401 and/or 403 and/or each other. For example, access terminals AT1 and AT2 can be connected to network 126a via air interface 104 and RAN 120 and access terminals AT3 and AT5 . . . N can be connected to network 126b via air interface 104 and RAN 120. Further, a terminal AT4 can connect directly to the Internet 175, and through Internet 175 can then connect to any of the system components described above. Carrier networks 126a and 126b can include PDSN 160, BSN 165, an application server 170, connection to the Internet 175 and a database 401. However, database 401 and other components may be located outside the carrier network 126a in alternative embodiments. Accordingly, though not shown, all or a portion of the carrier networks 126a and 126b can be bypassed and an exemplary system as described herein can be coupled, for example to access terminals, via the Internet 175. It should further be understood that a terminal AT4 can connect to the internet 175 indirectly and via other networks (not shown). Terminal AT4 can communicate with databases 401 and/or database 403 via internet 175.

Referring to FIG. 4, RAN 120, PDSN 160, BSN 165, Application Server 170 and Internet 175 of network 126a and 126b correspond to similar elements within FIG. 2, respectively. Accordingly, a further description of RAN 120, PDSN 160, BSN 165, Application Server 170 and Internet 175 has been omitted for the sake of brevity.

Gateway or routing unit 405 can translate dissimilar protocols and media/codec types to allow all users (and devices) to interact with each other with flexibility. For example, media transformations can include Send Email/SMS to Traditional Voice or PTT via a speech synthesizer, convert MMS to/from Push-to-Picture, support connectivity from Voice/PTT to multiple VoIP providers, such as Skype™, Vonage™, and the like, voice clips attached to an email played as messages to Voice Mail or PTT. Gateway or routing unit 405 can alternatively be located within the same carrier network to provide translation services to customers having dissimilar devices with different service requirements within the same carrier network.

Database 401 and 403 can contain a universal address book which can function as a global phone book that (subject to privacy restrictions) can provide a source of current directory information from wireless carriers or other network providers. Database 401 and database 403 can include a global, structured collection of each users' contact data along with all methods of reaching each individual contact. Further, database 401 and database 403 can utilize the Lightweight Directory Access Protocol (LDAP). LDAP is an application protocol for querying and modifying directory services running over Transmission Control Protocol/Internet Protocol (TCP/IP). Each individual contact entry in database 401 and 403 can be arranged in groups, and different permission levels can be set for each individual contact entry by the owner of each contact entry.

In the above described embodiment, a universal address book application or client may reside on any of the access terminals (i.e. AT1, AT2 and AT3). For example, the wireless client may include Binary Runtime Environment for Wireless (BREW) and/or JAVA for accessing this database. BREW is a software platform that can download and run small programs for playing games, sending messages, sharing photos, and the like. The universal address book application or client can integrate seamlessly with the access terminals user interface (UI) and address book, providing all of the standard "add" and "dial" functions. Further, the universal address book application or client can allow a user to send a push-activated calling card to another user in order to, for example, associate them as "friends" or "associates" in database 401 and 403. It should be noted that a push-activated service, such as push-to-talk (PTT), can refer to push activation of any service such as push-to-talk, push-to-video, push-to-picture or the like in accordance with available capabilities and features that can associate an action with a push of the operative button. For example, after selecting a person from the UI, the user can be presented with a list of communication methods that can be supported for the selected user. Therefore, the user would not have to use cryptic addresses and URLs in order to communicate with the selected user.

In the present embodiment, the user can also manage, upload, download, backup, and sync contacts, even if they do not have access to their wireless device, via a web-based portal on terminal AT4 into database(s) 401 and/or 403. Assuming AT4 is another computer with Internet access through, for example, a web browser, access to contact information for synchronizing or other activities as discussed and described herein can be made through the Internet via a separate wired or wireless service provider.

Referring to FIG. 4, AT1, AT2 and AT3 are illustrated as wireless mobile devices, AT4 is illustrated as a wired desktop station and AT5 . . . N is illustrated as a wireless tablet-PC. However, in other embodiments, it will be appreciated that the wireless communication system 100 can connect to any type of AT, and the examples illustrated in FIG. 4 are not intended to limit the types of AT(s) that may be implemented within the system.

Figure 5:
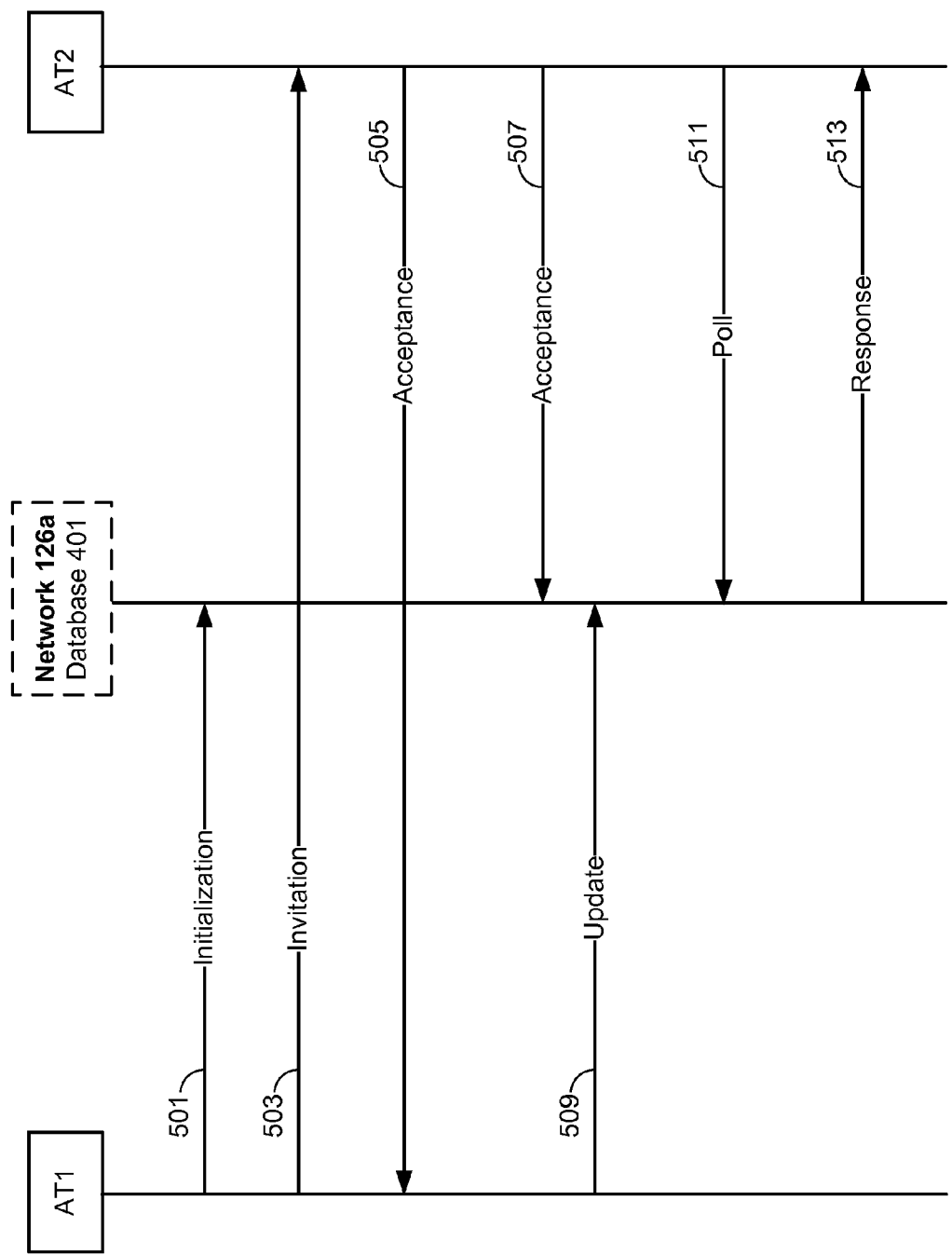
FIG. 5 is a diagram illustrating an exemplary call flow using pull technology for delivering update messages to a universal address book.
Figure 6:
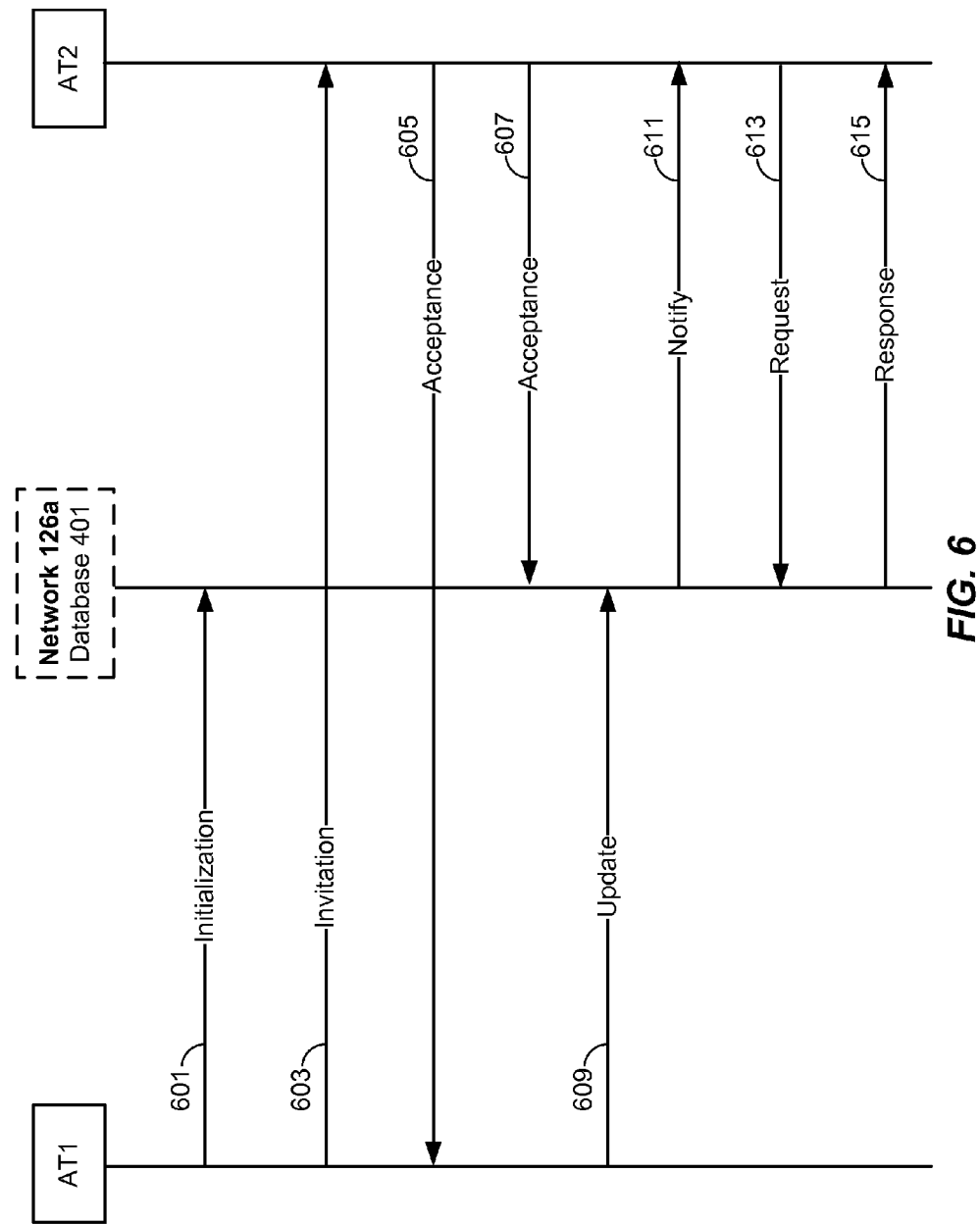
FIG. 6 is a diagram illustrating another exemplary call flow using push technology for delivering update messages to a universal address book.

Referring to FIG. 5 and FIG. 6, exemplary call flows are illustrated where pull and push technology is utilized for delivering update messages to a universal address book exemplary embodiment. The exemplary embodiment described in FIG. 5 and FIG. 6 illustrate access terminal AT1 communicating with access terminal AT2 via Air Interface 104, RAN 120 and Carrier Network 126a. Further, in this exemplary embodiment, both access terminals AT1 and AT2 can be attached to the same carrier network 126a and as a result database 401. For example, access terminal AT1 may publish personal information associated with a user thereof to database 401 using either a web interface or an applet on his/her mobile device or access terminal. Afterwards, access terminal AT1 can invite other users to receive access terminal AT1's information from database 401. Database 401 can then communicate with each access terminal within access terminal AT1's contacts by either a pull or a push technology in order to keep track of any database changes for each access terminal.

For example, the embodiment described in FIG. 5 can be characterized as pull technology. In pull technology, the access terminal can request the status of the database to account for any changes made to the database 401 and the database responds by providing a status update. For example, the embodiment described in FIG. 6 can be characterized as push technology. In a push technology, the database can send the status of the database to account for any changes made to the database 401, without receiving a status inquiry message-type from the access terminal.

Referring to FIG. 5, an exemplary call flow is illustrated where pull technology is utilized for delivering update messages to a universal address book exemplary embodiment. In particular, pull request 613 is triggered by notify 611 as will be described in greater detail herein below.

Accordingly, the access terminal AT1 can send an initialization message to the database 401, 501. For example, the initialization message can allow access terminal AT1 to enter his/her personal information to database 401 using either a web interface or an applet on the access terminal AT1. Further, access terminal AT1 may enter other users' (i.e. access terminal AT1's contacts) data to database 401, select other users, assign permissions for each user in order to allow them to see certain aspects of access terminal AT1's personal information in database 401 and organize the users into various groups/arrangements. For example, the personal information associated with the user of access terminal AT1 can include work telephone number(s), home telephone number(s), cellular telephone number(s), work email address, personal email address, postal address, instant messaging address, and the like.

Next, the access terminal AT1 can send an invitation message to the access terminal AT2, 503. The invitation message may contain a pointer which points to the location of access terminal AT1's contact information within database 401 and also to the location of access terminal AT2's contact information within access terminal AT1's database entry/entries. Further, the pointer may identify access terminal AT1 to access terminal AT2. However, the permission level(s) set above can determine the amount of information that access terminal AT2 may view of access terminal AT1. For example, the invitation message type/format can include SMS, MMS, Email, VoIP/SIP, PTT/PTX options including legacy iDEN, QChat and the like.

Afterwards, the access terminal AT2 can accept or deny the invitation message by sending a response to the invitation message to the access terminal AT1, 505. In this exemplary embodiment, the access terminal AT2 accepts the invitation from access terminal AT1 by sending an acceptance message to access terminal AT1, 505.

Further, the access terminal AT2 may also accept or deny the invitation message by sending a message to the database 401, 507. In this exemplary embodiment, the access terminal AT2 accepts the invitation from access terminal AT1 by sending an acceptance message to database 401, 507. Therefore, as access terminal AT1 updates his/her contact information in the future, the updates can be delivered to access terminal AT2 via a pull/push method. As a result, access terminal AT2 can always have the most recent version of access terminal AT1's contact information. Further, access terminal AT2 may update database entries associated with itself that are located within access terminal AT1's database entries. For example, the database entry that access terminal AT1 entered that is associated with access terminal AT1 may be inaccurate or of an outdated data type (i.e. a cell phone number). In such an instance, the data associated with the data type within database 401 is corrected, for example by AT1.

Subsequently, the access terminal AT1 can send an update message to the database 401 if any of access terminal AT1's data has changed, 509. For example, access terminal AT1 may have changed his/her cell phone number. The update message described herein can notify the database 401 of the cell phone number change (or any other changes). The database can then communicate with each access terminal within access terminal AT1's contacts by either a pull or a push method in order to keep track of any database changes for each access terminal. The embodiment described in FIG. 5 can be characterized as a pull method. In a pull method, the access terminal can request the status of the database to account for any changes made to the database 401 and the database responds by providing a status update. The embodiment described in FIG. 6 can be characterized as a push method. In a push method, the database can send the status of the database to account for any changes made to the database 401, without receiving a status inquiry message-type from the access terminal.

Next, the access terminal AT2 can send a poll message to the database 401, 511. The poll message sent by access terminal AT2 can inquire about any changes made to access terminal AT1's database entry/entries. For example, access terminal AT1 may have changed his/her cell phone number.

Further, the poll message can be sent periodically in order to prevent the contact information from becoming outdated/stale. For example, the poll message can be sent every 30 minutes, every day, once a week, or the like.

Afterwards, the database 401 can respond to the poll message by sending a response message to access terminal AT2 indicating the status of access terminal AT1's database entry/entries, 513.

FIG. 6 illustrates another exemplary call flow where push technology is utilized for delivering update messages to a universal address book exemplary embodiment. Referring to FIG. 6, 601 through 609 correspond to 501 through 509 of FIG. 5, respectively. Accordingly, a further description of 601 through 609 has been omitted for the sake of brevity.

In 611, the database 401 can send a notify message to the access terminal AT2. The notify message can inform the access terminal AT2 that the data contained in database 401 of access terminal AT1 has changed. Accordingly, the notify message may contain a pointer which points to the location of contact information within database 401 of access terminal AT1 and also to the location of contact information associated with database entry/entries for access terminal AT1 that are located within access terminal AT2.

Next, the access terminal AT2 can send a request message to the database 401, 613. The request message sent by access terminal AT2 can be used to inquire about any changes made to database entry/entries associated with access terminal AT1. For example, a user associated with access terminal AT1 may have changed his/her cell phone number. Further, access terminal AT2 may update database entries associated with itself that are located as database entries within access terminal AT1. For example, the database entry associated with access terminal AT1 may be inaccurate or may be associated with an outdated data type such as a cell phone number. Access terminal AT2 may correct the inaccurate data type within database 401. Afterwards, the database 401 can respond to the request message by sending a response message to access terminal AT2 indicating the status of the database entries associated with access terminal AT1 at 615.

It should be noted by way of summary that message 611 is typically a very concise notification that an update is available for a particular contact. A given AT may receive multiple 611 messages and may also be busy and not able to respond immediately. The 613 message is a request to send the update triggering the 615 message, which can be much larger than, for example the 611 message. The above described messaging allows an AT to regulate the amount of incoming data so as to avoid being overwhelmed if busy with other tasks and to control the amount of bandwidth used and prevent link congestion. It should further be noted that in accordance with various exemplary embodiments, users "own" their own information and can change the master copy of the information in the database, which causes the information to be changed everywhere else, such as in other ATs or the like. Changes to information about (owned by) others would not replicate to other ATs. The concept is that users do not have the right to send updates concerning others, because that information is owned by the user it describes.

Figure 7:
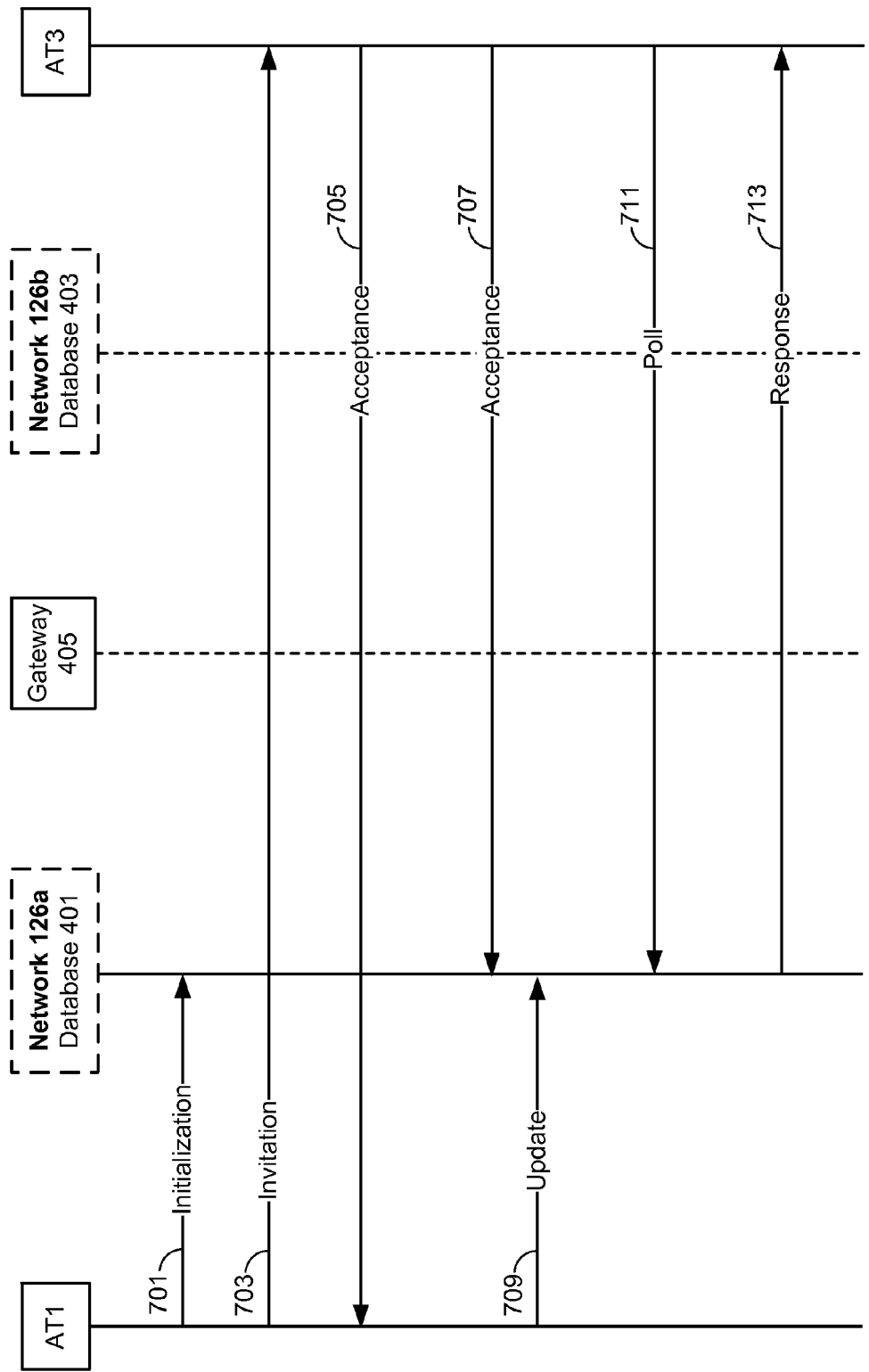
FIG. 7 is a diagram illustrating another exemplary call flow using pull technology for delivering update messages to a universal address book.
Figure 8:
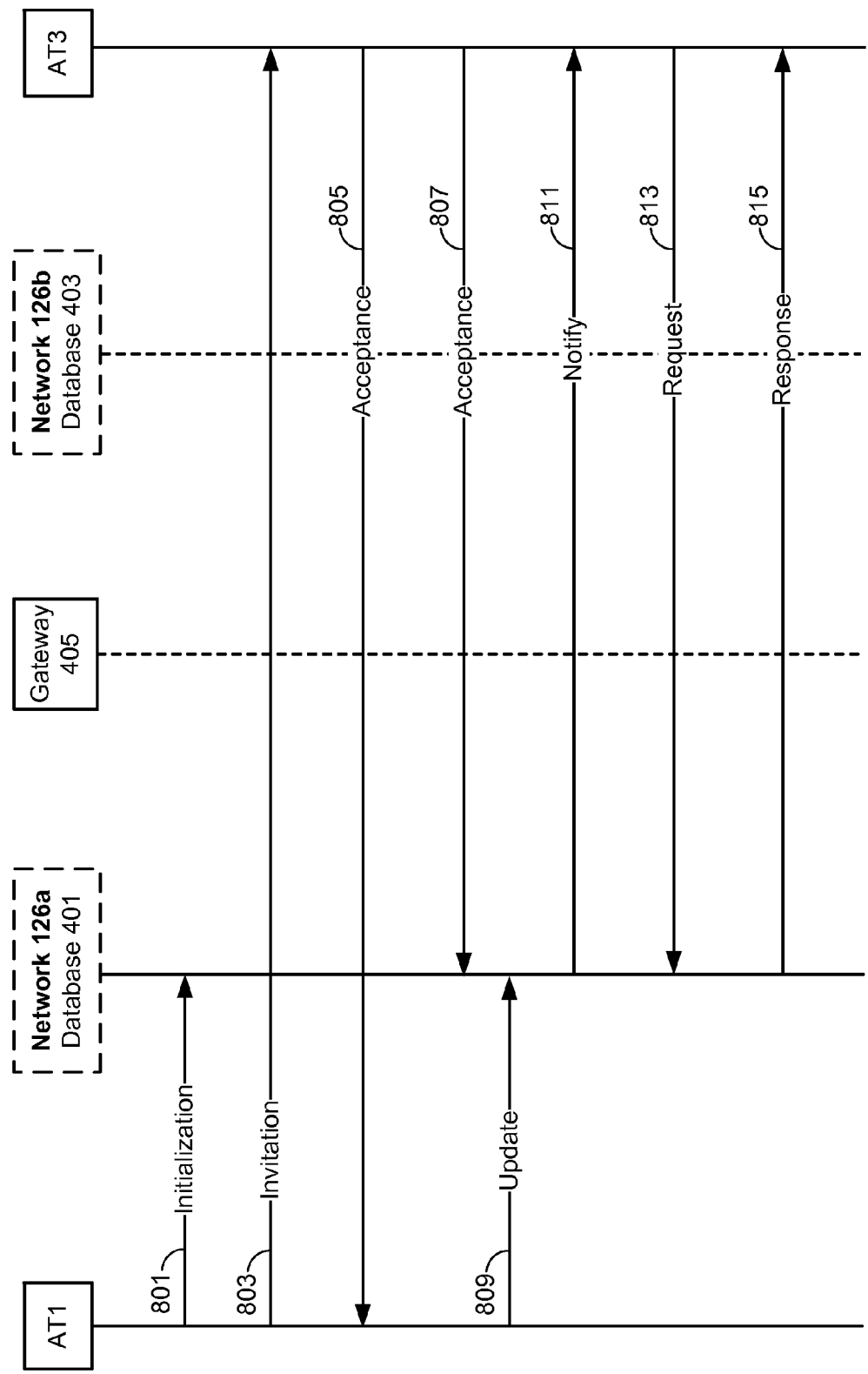
FIG. 8 is a diagram illustrating another exemplary call flow using push technology for delivering update messages to a universal address book.

Referring to FIGS. 7 and 8, exemplary call flows are illustrated where pull and push technology is utilized for delivering update messages to a universal address book exemplary embodiment. The exemplary embodiment described in FIGS. 7 and 8 illustrate access terminal AT1 communicating with access terminal AT3 via Air Interface 104, RAN 120, Carrier Network 126a and Carrier Network 126b. Further, in this exemplary embodiment, access terminal AT1 can be attached to carrier network 126a and access terminal AT3 can be attached to carrier network 126b. Furthermore, carrier network 126a may contain database 401 and carrier network 126b may contain database 403.

In an exemplary embodiment, access terminal AT1 may publish his/her personal information to database 401 using either a web interface or an applet on his/her mobile device or access terminal. Afterwards, access terminal AT1 can invite other users to receive access terminal AT1's information from database 401. Database 401 can then communicate with each access terminal within access terminal AT1's contacts by either a pull or a push technology in order to keep track of any database changes for each access terminal.

For example, the embodiment described in FIG. 7 can be characterized as pull technology and the embodiment described in FIG. 8 can be characterized as push technology. In short, the definitive or authoritative copy of the data associated with each user is stored in the respective home carrier database. In the exemplary multi-network system as discussed and described herein, a pointer or indirect reference to the location of the "home" database for each user can be provided. In other words, it would be possible that an AT would encounter a pointer that refers to one database to get updated information associated with user A and a different pointer that refers to another database for updated information associated with user B.

Referring to FIG. 7, an exemplary call flow is illustrated where pull technology is utilized for delivering update messages to a universal address book exemplary embodiment. Referring to FIG. 7, 701 through 713 correspond to 501 through 513 of FIG. 5, respectively. Accordingly, a further description of 701 through 713 has been omitted for the sake of brevity. However, the exemplary embodiment and call flow illustrated in FIG. 7 may contain differences with FIG. 5. For example, FIG. 7 illustrates that access terminal AT3 is connected to Carrier Network 126b. Therefore, the call flow illustrated by FIG. 7 may also traverse gateway 405 and Carrier Network 126b.

Referring to FIG. 8, an exemplary call flow is illustrated where push technology is utilized for delivering update messages to another universal address book exemplary embodiment. Referring to FIG. 8, 801 through 815 correspond to 601 through 615 of FIG. 6, respectively. Accordingly, a further description of 801 through 815 has been omitted for the sake of brevity. However, the exemplary embodiment and call flow illustrated in FIG. 8 may contain differences with FIG. 6. For example, FIG. 8 illustrates that access terminal AT3 is connected to Carrier Network 126b. Therefore, the call flow illustrated by FIG. 8 may also traverse gateway 405 and Carrier Network 126b.

Figure 9A:
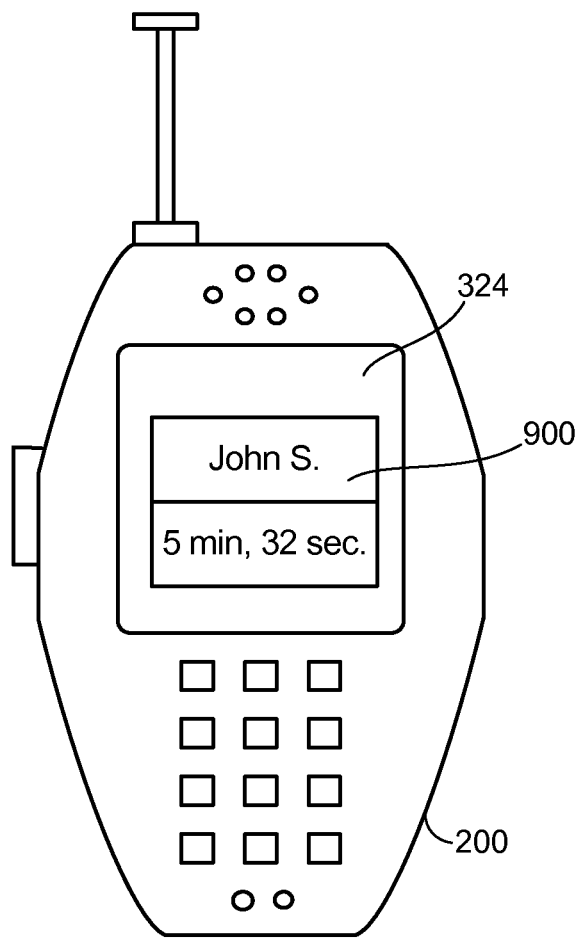
FIG. 9A is a diagram illustrating an exemplary access terminal for sending and receiving update messages to a universal address book.
Figure 9B:
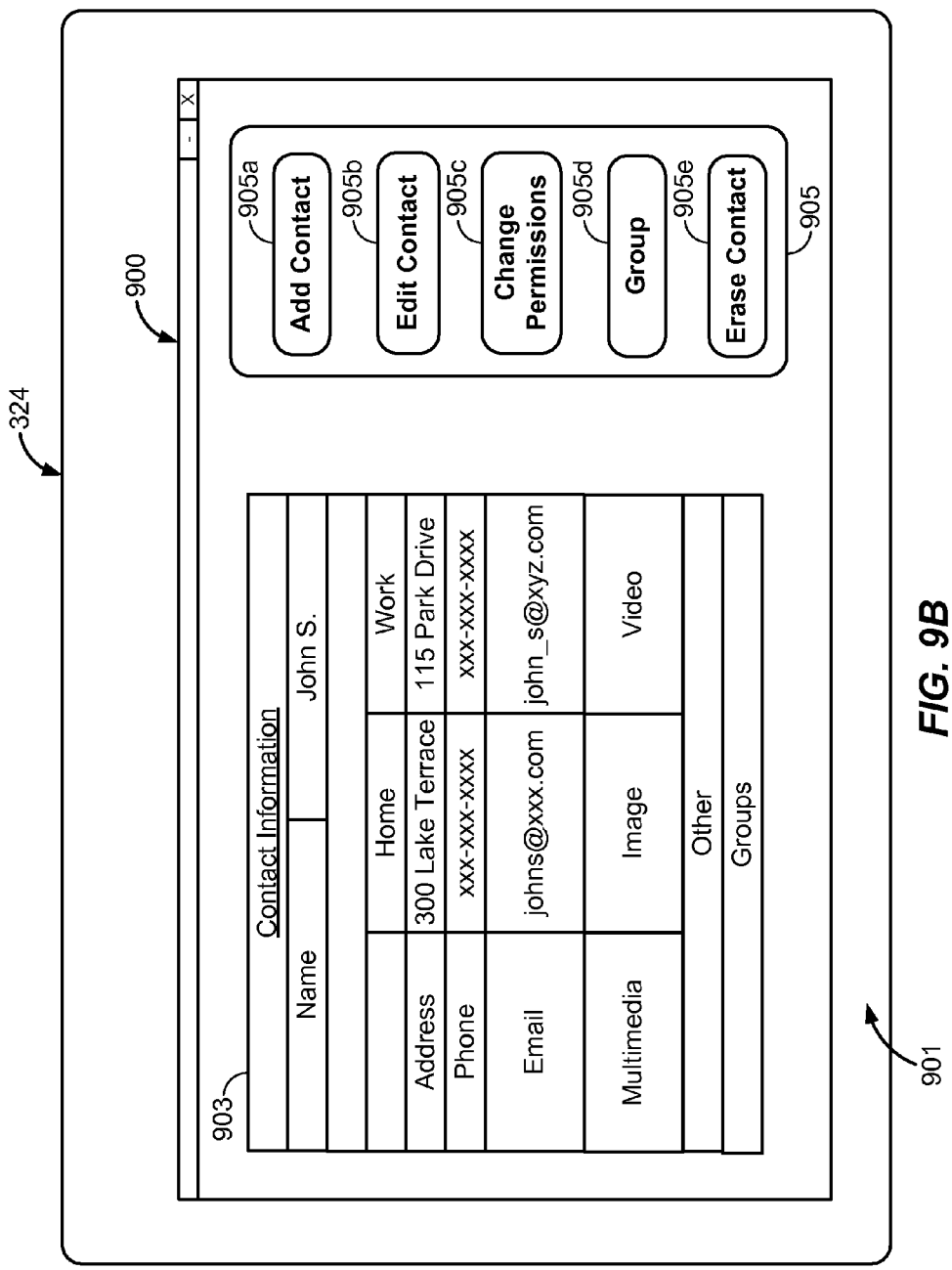
FIG. 9B is a diagram illustrating an exemplary user interface and navigational window associated with a database entry for an exemplary universal address book.

Referring to FIG. 9A, an exemplary access terminal is illustrated that is utilized for sending/receiving update messages to a universal address book exemplary embodiment and FIG. 9B illustrates an exemplary user interface and navigational window of the exemplary universal address book of database 401.

The exemplary access terminal 200 illustrated in FIG. 9A can be utilized to send/receive commands to the universal address book located in database 401. Access terminal 200 can include a display 324 that can be utilized to view navigational window(s) 900.

Referring to FIG. 9B, an exemplary user interface 324 of access terminal 200 and navigational window 900 are illustrated. Navigational window 900 can include an indicator or pointer 901. Pointer 901 can be utilized in conjunction with user interface 324 in order to operate any of the functions of the universal address book via access terminal 200. It should be noted that indicator or pointer 901 is a user interface component used to point to objects within navigational window 900 and should be distinguished from the pointer, which can be a software value or hardware register value used to provide a reference to a specific database where information associated with a specific access terminal can be found.

Navigational window 900 can display contact details for each contact entered in database 401. For example, in this exemplary illustration, the navigational window 900 can display a current contact entry 903 and a function button 905.

The current contact entry 903 can contain a variety of data types for each database 401 entry. For example, the current contact entry 903 can include the name of the current contact, home address, work address, home phone number, work phone number, personal email address, work email address, images of the current contact, videos of the current contact, group memberships and permissions, usernames for Instant Messaging services such as AIM, Yahoo, Google, ICQ and usernames for social network services such as MySpace, Facebook and the like. For example, in the present exemplary illustration the current contact entry 903 can display a current user named "John S.", with a home address of "300 Lake Terrace" and a personal email address of "johns@xxx.com", a work address of "115 Park Drive" and a work email address of "john_s@xyyz.com."

The function button 905 can perform a variety of functions that allow the user to add/edit contact entries. For example, the function button 905 can include add contact button 905a, edit contact button 905b, change permissions button 905c, group button 905d and erase contact button 905e. Though not shown, other functions are possible such as functions to edit one's own personal information and push updates to the central database.

The add contact button 905a can be utilized to add contacts in database 401. The edit contact button 905b can be utilized to edit a current contact contained in the database 401.

The change permissions button 905c can be utilized to change a current contact entry permissions level/setting. For example, the permission level/setting can be utilized by the user to assign permissions for each database entry (contact) in order to allow each contact to see certain aspects of access terminal AT1's personal information in database 401 and organize the contacts into various groups/arrangements. Therefore, the explicit permission level(s)/setting set above can determine the amount of information that contacts may view of access terminal AT1 (administrator). For example, access terminal AT2 can have my (access terminal AT1) work cell phone and access terminal AT3 can have my (access terminal AT1) home phone.

The group button 905d can be utilized to organize the contact entries into various groups/arrangements. The erase contact button 905e can be utilized to erase any contact entries contained in database 401.

Figure 10:
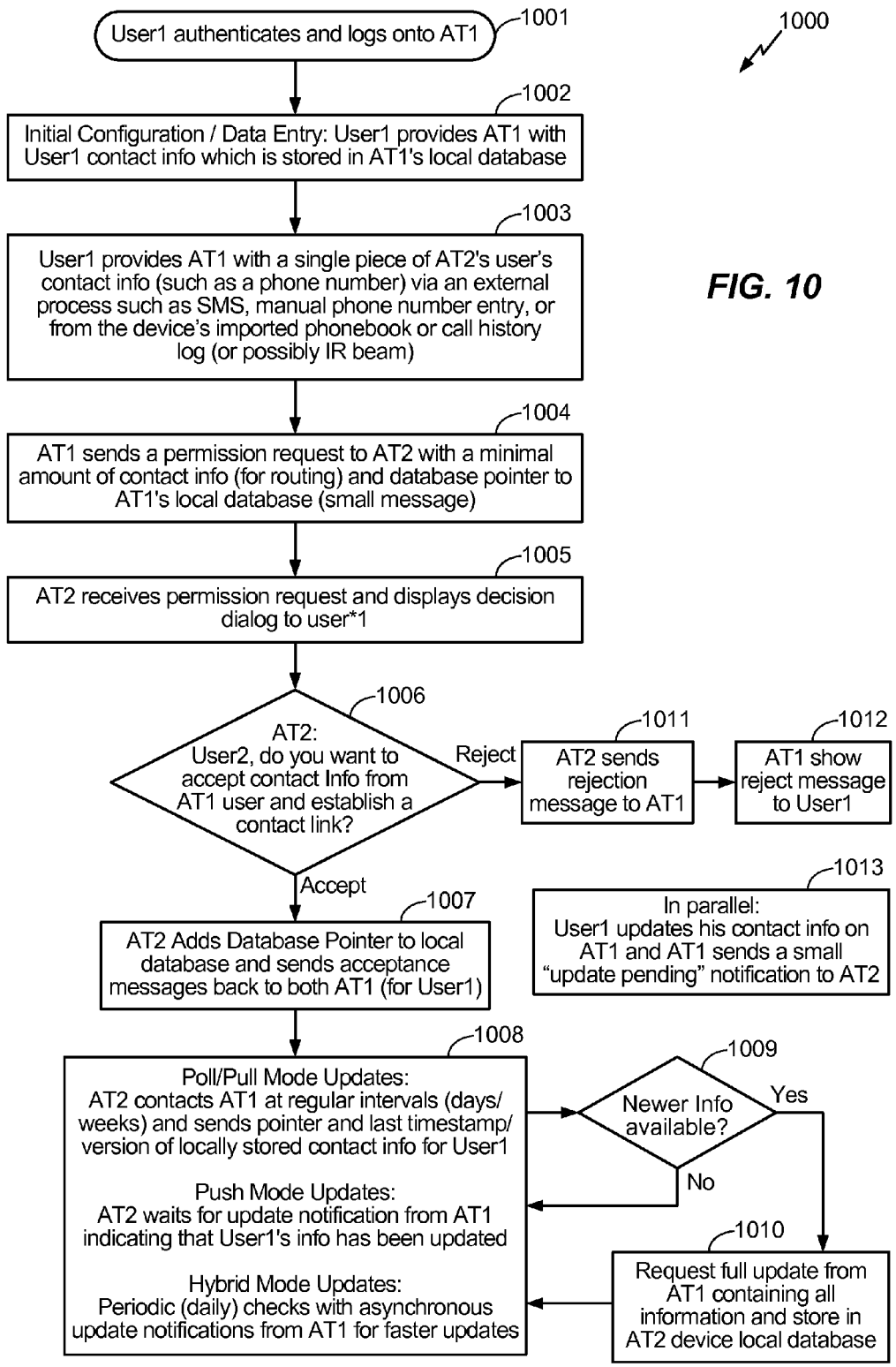
FIG. 10 is a flow chart illustrating an exemplary contact update procedure.

It will be appreciated that the contact updates can be conducted in accordance with an exemplary procedure 1000 as illustrated, for example, in FIG. 10. After start at 1001, where a User1 is authenticated and logs on to an access terminal such as AT1, the initial configuration, such as the contact information of User1, can be entered, for example into AT1, at 1002. The User1 can further enter contact information associated with AT2 such as a phone number, from a variety of sources such as SMS message, direct entry, call history log, address book, or the like, at 1003. AT1 can then send a permission request to AT2 with information such as contact information for the purpose of routing the request, and, for example, a pointer to a local database residing on AT1 using SMS or the like at 1004. AT2 can receive the request and display a dialog box that will prompt the user whether or not to accept the request at 1005. Alternatively, the request can be automatically accepted based on a configuration, such as the configuration performed at 1002.

The dialog results in a decision whether or not to accept the request 1006. If the request is accepted, the pointer can be added to the local database of AT2 and sends an acceptance to AT1 at 1007. In handling updates, several approaches can be used at 1008. For example, in a polling or pulling mode, AT2 can poll AT1 (and other contacts) periodically, sending a pointer and timestamp of the information stored for that user such as weekly. In a push mode, AT2 simply waits for update notifications from AT1 that User1 information has changed. In a hybrid mode, periodic checks can be conducted such as daily with asynchronous update notifications from AT1 can be performed. It can be determined whether new information is available at 1009. If newer information is available, the a request for a full update from AT1 can be made, whereupon the full information can be stored in the local database of AT2 at 1010.

In the event that the request for permission to update at 1006 is rejected, AT2 can send a rejection message to AT1 at 1011 and User1 of AT1 can be notified of the rejection at 1012. It will be appreciated that, for example, User1 can update contact information locally at any time and AT1 can send an update pending notification to AT2 and other contacts indicating that new information is available at 1013.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media can includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an embodiment of the invention can include a computer readable media embodying a method for synchronizing a universal address book located in a database amongst a first user and a second user. The media can contain instructions which, when read by a processor cause the processor to carry out various operations as follows. The first user sends an initialization message to the database; the first user sends an invitation message to the second user; the first user receives an acceptance message from the second user; and the first user sends an update message to the database. The initialization message includes current personal data of the first user, the invitation message includes a database pointer, and the update message changes the personal data of the first user in the database and informs the second user of the changed data of the first user. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of synchronizing a universal address book between access terminals at a first access terminal, comprising:

sending, via an access network, an initialization message to a database from the first access terminal associated with a first user, wherein the initialization message includes personal data of the first user that identifies one or more contact addresses at which the first user can be contacted;

sending, from the first access terminal, an invitation message to a second access terminal that invites the second access terminal to access the personal data of the first user within the database, wherein the invitation message includes a database pointer that points to the personal data of the first user within the database, and the invitation message is one of a plurality of invitation messages sent from the first access terminal to a plurality of access terminals including the second access terminal for inviting the plurality of access terminals to access the personal data of the first user within the database; and sending an update message to the database, from the first access terminal, wherein the update message changes the personal data of the first user in the database and is configured to prompt the database to inform only those of the plurality of access terminals that accepted a corresponding invitation message of the plurality of invitation messages that the personal data of the first user in the database has been updated and is available for download upon request irrespective of whether any other access terminal maintains any contact information of the first user in any associated contact book.

2. The method according to claim 1, wherein the database pointer identifies a database entry location of the personal data of the first user within the database.

3. The method according to claim 1, wherein at least one of the initialization message or the update message is sent to the database via an application contained on the first access terminal.

4. The method of claim 3, wherein the application includes an authentication feature to verify an identity of the first user.

5. The method according to claim 1, wherein at least one of the initialization message or the update message is sent to the database via a web interface.

6. The method according to claim 1, wherein the initialization message sent to the database includes a Lightweight Directory Access Protocol (LDAP) message.

7. The method according to claim 1, wherein the update message sent to the database includes a Lightweight Directory Access Protocol (LDAP) message.

8. The method according to claim 1, wherein the update message is configured to prompt the database to inform the second access terminal of the updated personal data via a pull technology message type.

9. The method according to claim 1, wherein the update message is configured to prompt the database to inform the second access terminal of the updated personal data via a push technology message type.

10. The method according to claim 1, wherein the first user and a second user are connected to a single carrier network.

11. The method according to claim 1, wherein the first user and a second user are connected to different carrier networks.

12. The method of claim 1, wherein the invitation message, if accepted by the second access terminal, is configured to trigger the second access terminal to transmit acceptance messages to both the first access terminal and the database based on routing information for the first access terminal that is contained in the invitation message and the database pointer, respectively.

13. The method of claim 1, wherein the update message is only sent to access terminals that were earlier invited by the first user to access the personal data of the first user within the database.

14. A method of synchronizing a universal address book between access terminals at a database that is configured to be accessed by the access terminals via an access network comprising:
receiving an initialization message from a first access terminal that is associated with a first user, wherein the initialization message includes personal data of the first user that identifies one or more contact addresses at which the first user can be contacted;
storing, within the database, the personal data of the first user that is contained in the initialization message;
receiving an acceptance message from a second access terminal that is associated with a second user, wherein the acceptance message indicates acceptance of one of a plurality of invitation messages sent from the first access terminal to a plurality of access terminals including the second access terminal to access the personal data of the first user within the database, wherein each invitation message includes a database pointer that points to the personal data of the first user within the database;
receiving an update message from the first access terminal;
updating the personal data of the first user stored within the database in response to the update message; and
pushing, in response to the personal data of the first user has been updated successfully, a notification to only those of the plurality of access terminals that accepted a corresponding invitation message of the plurality of invitation messages that the personal data of the first user stored within the database has been updated and is available for download upon request irrespective of whether any other access terminal maintains any contact information of the first user in any associated contact book.

15. The method according to claim 14, wherein the database is associated with the second user via a second database pointer, and wherein the second database pointer identifies a database entry location of personal information of the second user.

16. The method according to claim 14, wherein at least one of the initialization message or the update message is received at the database via an applet contained on the first access terminal.

17. The method according to claim 14, wherein at least one of the initialization message or the update message is received at the database via a web interface.

18. The method according to claim 14, wherein the initialization message received by the database includes a Lightweight Directory Access Protocol (LDAP) message.

19. The method according to claim 14, wherein the acceptance message received by the database includes a Lightweight Directory Access Protocol (LDAP) message.

20. The method according to claim 14, wherein the update message received by the database includes a Lightweight Directory Access Protocol (LDAP) message.

21. The method according to claim 14, wherein the second access terminal is informed that the personal data of the first user stored within the database has been updated includes a Lightweight Directory Access Protocol (LDAP) message.

22. The method according to claim 14, wherein the second access terminal is informed that the personal data of the first user stored within the database has been updated by a pull technology message type.

23. The method according to claim 14, wherein the second access terminal is informed that the personal data of the first user stored within the database has been updated by a push technology message type.

24. The method according to claim 14, wherein the first user and second user are connected to a single carrier network.

25. The method according to claim 14, wherein the first user and second user are connected to different carrier networks.

26. The method according to claim 14, further comprising:
receiving a poll message from the second access terminal; and
determining, in response to the poll message, that the personal data of the first user stored within the database has been updated,
wherein the informing informs the second access terminal that the personal data of the first user stored within the database has been updated responsive to the determination by sending at least a portion of the updated personal data of the first user to the second access terminal.

27. The method according to claim 14, further comprising:
wherein the informing informs the second access terminal that the personal data of the first user stored within the database has been updated by sending a notifying message to the second access terminal, further comprising:
receiving a request message from the second access terminal in response to the notifying message; and
sending a response message to the second access terminal that includes at least a portion of the updated personal data of the first user in response to the request message.

28. An apparatus corresponding to a first access terminal associated with a first user that is configured to synchronize a universal address book with a second access terminal associated with a second user, comprising:
a transceiver, implemented at least partially by hardware, configured to:

send, from the first access terminal, an initialization message via an access network to a database, the initialization message including personal data of the first user that identifies one or more contact addresses at which the first user can be contacted, send, from the first access terminal, an invitation message to the second access terminal that invites the second access terminal to access the personal data of the first user within the database, wherein the invitation message includes a database pointer that points to the personal data of the first user within the database, the invitation message is one of a plurality of invitation messages sent to a plurality of access terminals including the second access terminal for inviting the plurality of access terminals to access the personal data of the first user within the database, and send, from the first access terminal, an update message to the database to change the personal data of the first user in the database wherein the update message is configured to prompt the database to inform only those of the plurality of access terminals that accepted a corresponding invitation message of the plurality of invitation messages that the personal data of the first user in the database has been updated and is available for download upon request irrespective of whether any other access terminal maintains any contact information for the first user in any associated contact book.

29. The apparatus according to claim 28, wherein the database pointer identifies a database entry location of the personal data of the first user within the database.

30. The apparatus according to claim 28, wherein at least one of the initialization message or the update message is sent via an application contained on the first access terminal.

31. The apparatus of claim 30, wherein the application includes an authentication feature to verify an identity of the first user.

32. The apparatus according to claim 28, wherein at least one of the initialization message or the update message is sent via a web interface.

33. The apparatus according to claim 28, wherein the initialization message sent to the database includes a Lightweight Directory Access Protocol (LDAP) message.

34. The apparatus according to claim 28, wherein the update message sent to the database includes a Lightweight Directory Access Protocol (LDAP) message.

35. The apparatus according to claim 28, wherein the update message is configured to prompt the database to inform the second access terminal of the database update via a pull technology message type.

36. The apparatus according to claim 28, wherein the update message is configured to prompt the database to inform the second access terminal of the database update via a push technology message type.

37. The apparatus according to claim 28, wherein the first access terminal and the second access terminal are connected to a single carrier network.

38. The apparatus according to claim 28, wherein the first access terminal and the second access terminal are connected to different carrier networks.

39. An apparatus corresponding to a first access terminal associated with a first user that is configured to synchronize a universal address book with a second access terminal associated with a second user, comprising:

means for sending, from the first access terminal, an initialization message via an access network to a database, the initialization message including personal data of the first user that identifies one or more contact addresses at which the first user can be contacted;

means for sending, from the first access terminal, an invitation message to the second access terminal that invites the second access terminal to access the personal data of the first user within the database, wherein the invitation message includes a database pointer that points to the personal data of the first user within the database, wherein the invitation message is one of a plurality of invitation messages sent to a plurality of access terminals including the second access terminal for inviting the plurality of access terminals to access the personal data of the first user within the database; and means for sending, from the first access terminal, an update message to the database to change the personal data of the first user in the database wherein the update message is configured to prompt the database to inform only those of the plurality of access terminals that accepted a corresponding invitation message of the plurality of invitation messages that the personal data of the first user in the database has been updated and is available for download upon request irrespective of whether any other access terminal maintains any contact information for the first user in any associated contact book.

40. The apparatus according to claim 39, wherein the database pointer identifies a database entry location of the personal data of the first user within the database.

41. The apparatus according to claim 39, wherein at least one of the initialization message or the update message is sent via an application contained on the first access terminal.

42. The apparatus of claim 41, wherein the application includes an authentication feature to verify an identity of the first user.

43. The apparatus according to claim 39, wherein the at least one of the initialization message or the update message is sent via a web interface.

44. The apparatus according to claim 39, wherein the initialization message sent to the database includes a Lightweight Directory Access Protocol (LDAP) message.

45. The apparatus according to claim 39, wherein the update message sent to the database includes a Lightweight Directory Access Protocol (LDAP) message.

46. The apparatus according to claim 39, wherein the update message is configured to prompt the database to inform the second access terminal of the database update via a pull technology message type.

47. The apparatus according to claim 39, wherein the update message is configured to prompt the database to inform the second access terminal of the database update via a push technology message type.

48. The apparatus according to claim 39, wherein the first access terminal and the second access terminal are connected to a single carrier network.

49. The apparatus according to claim 39, wherein the first access terminal and the second access terminal are connected to different carrier networks.

50. A non-transitory computer readable storage medium having instructions thereon for synchronizing a universal address book between access terminals at a first access terminal when read and executed by a processor, cause the processor to perform functions associated therewith, the instructions comprising:

at least one instruction to send, from the first access terminal via an access network, an initialization message to a database from the first access terminal associated with a first user, wherein the initialization message includes personal data of the first user that identifies one or more contact addresses at which the first user can be contacted;

at least one instruction to send, from the first access terminal, an invitation message to a second access terminal that invites the second access terminal to access the personal data of the first user within the database, wherein
 the invitation message includes a database pointer that points to the personal data of the first user within the database, and
 the invitation message is one of a plurality of invitation messages sent to a plurality of access terminals including the second access terminal for inviting the plurality of access terminals to access the personal data of the first user within the database; and at least one instruction to send an update message to the database, from the first access terminal, wherein the update message changes the personal data of the first user in the database and is configured to prompt the database to inform only those of the plurality of access terminals that accepted a corresponding one of the plurality of invitation messages that the personal data of the first user in the database has been updated and is available for download upon request irrespective of whether any other access terminal maintains any contact information for the first user in any associated contact book.

51. A non-transitory computer readable storage medium having instructions thereon for synchronizing a universal address book between access terminals at a database that is configured to be accessed by the access terminals via an access network, the instructions when read and executed by a processor, cause the processor to perform functions associated therewith, the instructions comprising:

at least one instruction to receive an initialization message from a first access terminal that is associated with a first user, wherein the initialization message includes personal data of the first user that identifies one or more contact addresses at which the first user can be contacted;

at least one instruction to store, within the database, the personal data of the first user that is contained in the initialization message;

at least one instruction to receive an acceptance message from a second access terminal that is associated with a second user, wherein
 the acceptance message indicates acceptance of one of a plurality of invitation messages sent from the first access terminal to a plurality of access terminals including the second access terminal to access the personal data of the first user within the database, and
 each invitation message includes a database pointer that points to the personal data of the first user within the database;

at least one instruction to receive an update message from the first access terminal;

at least one instruction to update the personal data of the first user stored within the database in response to the update message; and at least one instruction to push, in response to the personal data of the first user has been updated successfully, a notification to only those of the plurality of access terminals that accepted a corresponding invitation message of the plurality of invitation messages that the personal data of the first user stored within the database has been updated and is available for download upon request irrespective of whether any other access terminal maintains any contact information for the first user in any associated contact book.

52. A database apparatus configured to be accessed by access terminals via an access network and to synchronize a universal address book between the access terminals, comprising:

a computer processor, implemented at least partially by hardware, coupled to memory, the processor configured to:
 receive an initialization message from a first access terminal that is associated with a first user, wherein the initialization message includes personal data of the first user that identifies one or more contact addresses at which the first user can be contacted;
 store, within the database, the personal data of the first user that is contained in the initialization message;
 receive an acceptance message from a second access terminal that is associated with a second user, wherein
  the acceptance message indicates acceptance of one of a plurality of invitation messages sent from the first access terminal to a plurality of access terminals including the second access terminal to access the personal data of the first user within the database, and
  each invitation message includes a database pointer that points to the personal data of the first user within the database;
 receive an update message from the first access terminal;
 update the personal data of the first user stored within the database in response to the update message; and
 push, in response to the personal data of the first user has been updated successfully, a notification to only those of the plurality of access terminals that accepted a corresponding invitation message of the plurality of invitation messages that the personal data of the first user stored within the database has been updated and is available for download upon request irrespective of whether any other access terminal maintains any contact information for the first user in any associated contact book.

53. A database configured to be accessed by access terminals via an access network and to synchronize a universal address book between the access terminals, comprising:

means for receiving an initialization message from a first access terminal that is associated with a first user, wherein the initialization message includes personal data of the first user that identifies one or more contact addresses at which the first user can be contacted;

means for storing, within the database, the personal data of the first user that is contained in the initialization message;

means for receiving an acceptance message from a second access terminal that is associated with a second user, wherein
 the acceptance message indicates acceptance of one of a plurality of invitation messages sent from the first access terminal to a plurality of access terminals including the second access terminal to access the personal data of the first user within the database, and each invitation message includes a database pointer that points to the personal data of the first user within the database;

means for receiving an update message from the first access terminal;

means for updating the personal data of the first user stored within the database in response to the update message; and means for pushing, in response to the personal data of the first user has been updated successfully, a notification to only those of the plurality of access terminals that accepted a corresponding invitation message of the plurality of invitation messages that the personal data of the first user stored within the database has been updated and is available for download upon request irrespective of whether any other access terminal maintains any contact information for the first user in any associated contact book.

\* \* \* \* \*